Patented Apr. 24, 1951

2,549,784

UNITED STATES PATENT OFFICE 2,549,784

1,4 DIAMINOANTHRAQUINONE COMPOUNDS CONTAINING A CARBOXY-β-TETRAHYDROFURFURYLOXYALKYLAMIDE GROUP IN THE 2-POSITION

Joseph B. Dickey and Anthony Loria, Rochester, N. Y., assignors to Eastman Kodak Company, Rochester, N. Y., a corporation of New Jersey No Drawing. Application November 1, 1947, Serial No. 783,624

7 Claims. (Cl. 260—345)

This invention relates to new anthraquinone compounds which are of value to the dyeing or coloring art. The new compounds are particularly of value for the dyeing of textile materials made of or containing a cellulose carboxylic ester, in which ester the acid radical contains from two to four carbon atoms.

The cellulose carboxylic esters which may be dyed or colored include the hydrolyzed as well as the unhydrolyzed cellulose organic acid esters such as cellulose acetate, cellulose propionate, or cellulose butyrate and the hydrolyzed as well as the unhydrolyzed mixed organic acid esters of cellulose such as cellulose acetate-propionate and cellulose acetate-butyrate. While our invention will be illustrated more particularly in connection with the coloration of cellulose acetate, a material to which our new dye compounds are especially adapted, it will be understood that it applies to the coloration of other cellulose carboxylic esters such as those just mentioned.

Much effort has been devoted to the preparation of dye compounds which will satisfactorily dye the aforesaid cellulose carboxylic ester textile materials, especially cellulose acetate textile materials. We have found new anthraquinone compounds which color these materials blue shades which possess good light and gas fastness properties.

It is, therefore, an object of our invention to provide new anthraquinone compounds. Another object of our invention is to provide new dyes by means of which textile materials can be colored. A further object is to provide colorations on textile materials which are of good fastness to light, gas, and washing. A specific object of our invention is to provide new anthraquinone compounds which color cellulose acetate textile materials blue shades fast to light, gas, and washing. A still further object is to provide a satisfactory process for preparing the new compounds of our invention. Other objects will appear hereinafter.

The anthraquinone compounds by means of which the aforesaid objects are accomplished or made possible may be represented by the general formula:

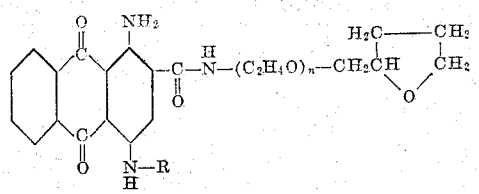

wherein R stands for a hydrogen atom, an alkyl group having one to four, inclusive, carbon atoms, a hydroxyalkyl group having two to three, inclusive, carbon atoms, an alkoxyalkyl group having three to four, inclusive, carbon atoms, the tetrahydrofurfuryl group or the

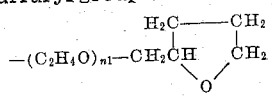

group, and wherein $n$ and $n_1$ each represent the number one, two or three.

The anthraquinone compounds of our invention can be conveniently prepared by reacting an amine having the formula:

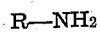

wherein R has the meaning previously assigned to it with an anthraquinone compound having the formula:

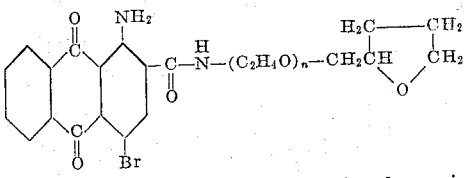

wherein $n$ has the meaning previously assigned to it, in the presence of cuprous iodide and potassium acetate. The reaction can be carried out by heating together a mixture of the above materials under reflux at atmospheric pressure or under superatmospheric pressure in a closed reaction vessel such as an autoclave. Normally the reaction mixture is heated under reflux for approximately three hours. As a solvent an excess of the amine, R—NH₂, or an inert diluent such as n-butanol or pyridine may be employed. When the reaction mixture has undergone the required heating period it is cooled to room temperature and poured into an excess of dilute hydrochloric acid. The precipitated dye compound is then recovered by suction filtration, washed with water, and dried.

The following examples illustrate the anthraquinone compounds of our invention and their manner of preparation.

Example 1

10 grams of 1-amino-4-bromoanthraquinone-2-carboxy-β-tetrahydrofurfuryloxyethylamide are charged into an autoclave containing 100 cc. of n-butanol, 25 cc. of 28% aqueous ammonia, 0.1 gram of cuprous iodide, and 2 grams of potassium acetate. The autoclave is sealed, and the reaction mixture is heated at 160° C. for ten hours. When cool, the resulting clear blue solution is poured into 50 cc. of 9% hydrochloric acid to precipitate the dye compound which is recovered by filtration, washed with water, and dried. 1,4 - diaminoanthraquinone-2-carboxy-β-tetrahydrofurfuryloxyethylamide having the formula:

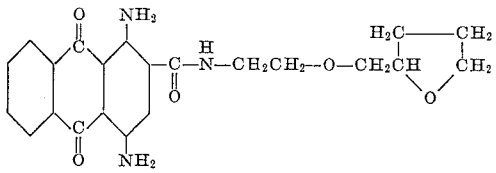

is obtained. It colors cellulose acetate textile materials blue shades.

*Example 2*

10 grams of 1-amino-4-bromoanthraquinone-2-carboxy-β-tetrahydrofurfuryloxy-β-ethoxyethylamide are placed in an autoclave containing 100 cc. of n-butanol. 25 cc. of 30% aqueous methylamine, 0.1 gram of cuprous iodide, and 2 grams of potassium acetate are then added and the autoclave is sealed. The reaction mixture is heated to 160° C. and maintained at this temperature for ten hours. When cool, the contents of the autoclave are poured into 50 cc. of 9% hydrochloric acid with stirring. The dye compound which precipitates is recovered by filtration, washed with water, and dried. The resulting 1 - amino-4-methylaminoanthraquinone-2-carboxy - β - tetrahydrofurfuryloxy-β-ethoxyethylamide colors cellulose acetate blue shades. It has the formula:

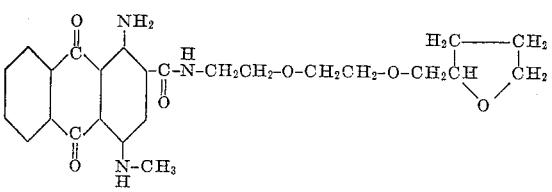

*Example 3*

10 grams of 1-amino-4-bromoanthraquinone-2-carboxy-β-tetrahydrofurfuryloxyethylamide, 10 cc. of a 30% aqueous solution of methylamine, 0.5 gram of cuprous iodide, and 2 grams of potassium acetate are added to 50 cc. of pyridine. The reaction mixture is heated under reflux on a steam bath for three hours with stirring. Upon cooling, the blue solution is poured into an excess of dilute hydrochloric acid and the precipitate formed is recovered by filtration, washed with water, and dried. The 1-amino-4-methylaminoanthraquinone-2-carboxy-β - tetrahydrofurfuryloxyethylamide thus obtained colors cellulose acetate blue shades. It has the formula:

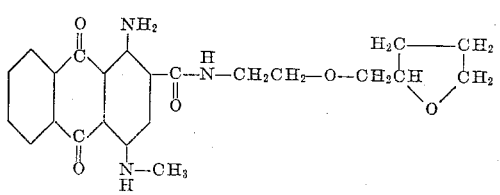

*Example 4*

8.8 grams of 1-amino-4-bromoanthraquinone-2-carboxy-β-tetrahydrofurfuryloxyethylamide, 5 grams of β,γ-dihydroxypropylamine, 0.1 gram of cuprous iodide and 2 grams of potassium acetate are heated together with stirring on a steam bath for about three hours. When cool, the reaction mixture is poured into an excess of dilute hydrochloric acid, and the precipitate formed is recovered by filtration, washed with water, and dried. 1 - amino-4-β,γ - dihydroxypropylaminoanthraquinone - 2-carboxy-β-tetrahydrofurfuryloxyethylamide which has the formula:

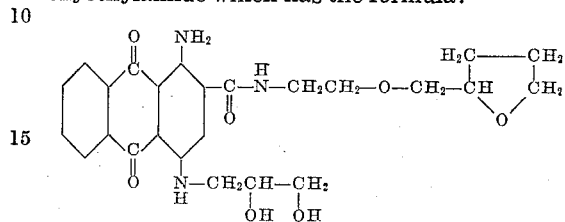

is obtained. It colors cellulose acetate blue shades.

*Example 5*

9.7 grams of 1-amino-4-bromoanthraquinone-2-carboxy-β-tetrahydrofurfuryloxy-β-ethoxyethylamide, 5 grams of ethanolamine, 2 grams of potassium acetate, and 0.1 gram of cuprous iodide are heated together, with stirring, on a steam bath for 3 hours. When cool, the reaction mixture is worked up in accordance with the procedure described in Example 4. 1-amino-4-β-hydroxyethylaminoanthraquinone - 2 - carboxy-β-tetrahydrofurfuryloxy-β-ethoxyethylamide which has the formula:

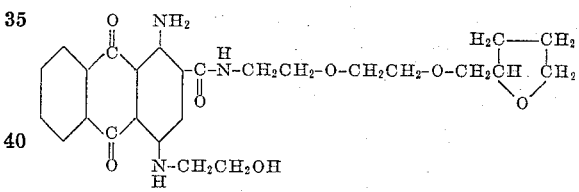

is obtained. It colors cellulose acetate blue shades.

*Example 6*

9.7 grams of 1-amino-4-bromoanthraquinone-2-carboxy-β-tetrahydrofurfuryloxy-β-ethoxyethylamide, 5 grams of n-butylamine, 0.1 gram of cuprous iodide, and 2 grams of potassium acetate are reacted together and worked up in accordance with the procedure described in Example 4. 1 - amino-4 - n-butylaminoanthraquinone-2-carboxy - β-tetrahydrofurfuryloxy-β-ethoxyethylamide which has the formula:

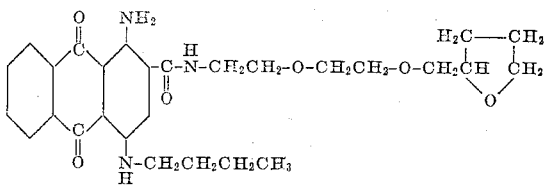

is obtained. It colors cellulose acetate blue shades.

*Example 7*

10.6 grams of 1-amino-4-bromoanthraquinone-2 - carboxy-β-tetrahydrofurfuryloxy-β-ethoxy-β-ethoxyethylamide, 5 grams of β-methoxyethylamine, 0.1 gram of cuprous iodide, and 2 grams of potassium acetate are reacted together and worked up in accordance with the procedure described in Example 4. 1-amino-4-β-methoxyethylaminoanthraquinone - 2-carboxy-β-tetrahydrofurfuryloxy - β - ethoxy-β-ethoxyethylamide which has the formula:

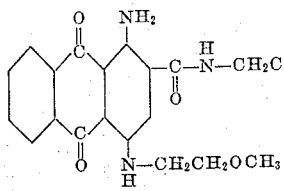

is obtained. It colors cellulose acetate blue shades.

*Example 8*

8.8 grams of 1-amino-4-bromoanthraquinone-2-carboxy-β-tetrahydrofurfuryloxyethylamide, 5 grams of β-tetrahydrofurfuryloxyethylamine, 0.1 gram of cuprous iodide, and 2 grams of potassium acetate are reacted together and worked up in accordance with the procedure of Example 4. 1-amino-4-β-tetrahydrofurfuryloxyethylaminoanthraquinone-2-carboxy-β-tetrahydrofurfuryloxyethylamide which has the formula:

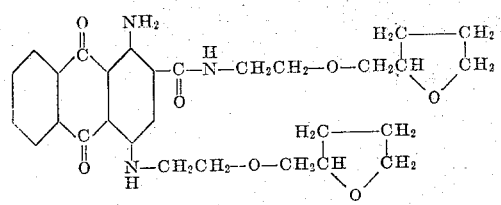

is obtained. It colors cellulose acetate blue shades.

*Example 9*

9.7 grams of 1-amino-4-bromoanthraquinone-2-carboxy - β-tetrahydrofurfuryloxy - β - ethoxyethylamide, 5 grams of tetrahydrofurfurylamine, 0.1 gram of cuprous iodide, and 2 grams of potassium acetate are reacted together and worked up in accordance with the procedure of Example 4. The 1-amino-4-tetrahydrofurfurylaminoanthraquinone-2-carboxy-β - tetrahydrofurfuryloxy - β-ethoxyethylamine which is obtained colors cellulose acetate blue shades. It has the formula:

of 1-amino-4-bromoanthraquinone-2-carboxy-β-tetrahydrofurfuryloxy-β-ethoxy-β - ethoxyethyl- amide, 10 cc. of a 30% aqueous solution of ethylamine, 0.5 gram of cuprous iodide, 2 grams of potassium acetate and 50 cc. of pyridine. The reaction mixture is reacted together and worked up in accordance with the procedure of Example 3. The 1-amino-4-ethylaminoanthraquinone-2-carboxy-β - tetrahydrofurfuryloxy - β - ethoxy-β-ethoxyethylamide which is obtained colors cellulose acetate blue shades. This dye has the formula:

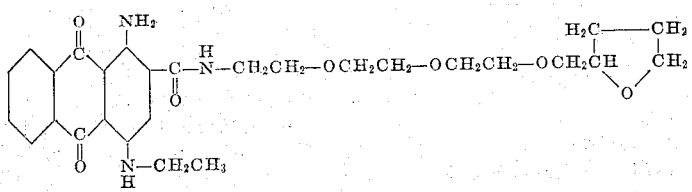

*Example 11*

8.8 grams of 1-amino-4-bromoanthraquinone-2-carboxy-β-tetrahydrofurfuryloxyethylamide, 5 grams of β-ethoxyethylamine, 0.1 gram of cuprous iodide, and 2 grams of potassium acetate are reacted together and worked up in accordance with the procedure of Example 4. The dye, 1-amino-4 - β - ethoxyethylaminoanthraquinone - 2 - carboxy-β-tetrahydrofurfuryloxyethylamide which has the formula:

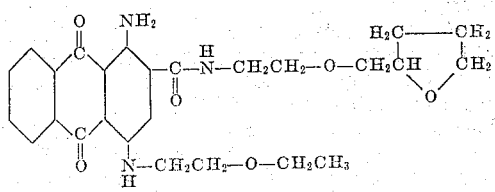

is obtained. It colors cellulose acetate blue shades.

*Example 12*

8.8 grams of 1-amino-4-bromoanthraquinone-2-carboxy-β-tetrahydrofurfuryloxyethylamide, 5 grams of γ-hydroxypropylamine, 0.1 gram of cuprous iodide, and 2 grams of potassium acetate are reacted together and worked up in accordance with the procedure described in Example 4. The resulting 1-amino-4 - γ - hydroxypropylaminoanthraquinone-2 - carboxy-β-tetrahydrofurfuyloxyethylamide colors cellulose acetate blue shades. The dye has the formula:

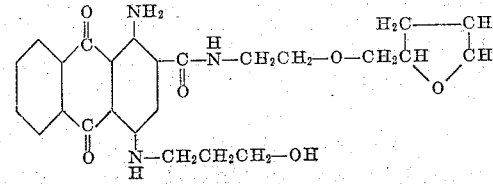

*Example 10*

A suitable autoclave is charged with 10.6 grams

Example 13

10.6 grams of 1-amino-4-bromoanthraquinone-2-carboxy-β-tetrahydrofurfuryloxy - β-ethoxy-β-ethoxyethylamide, 5 grams of β-hydroxyethylamine, 0.1 gram of cuprous iodide, and 2 grams of potassium acetate are reacted together and worked up in accordance with the procedure described in Example 4. The resulting 1-amino-4-β-hydroxyethylaminoanthraquinone - 2-carboxy-β-tetrahydrofurfuryloxy-β - ethoxy - β - ethoxyethylamide colors cellulose acetate blue shades. The dye has the formula:

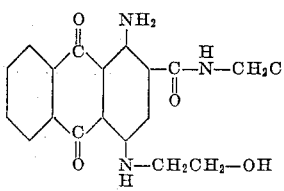

In order that the preparation of the compounds of our invention may be entirely clear the preparation of certain of the intermediates used in their manufacture is set forth hereinafter.

1-amino-4-bromoanthraquinone - 2-carboxy-β-tetrahydrofurfuryloxyalkylamide compounds may be prepared by reacting 1-amino-4-bromoanthraquinone-2-carboxylic acid chloride with an amine having the formula:

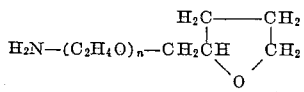

wherein $n$ has the meaning previously assigned to it. The reaction is carried out by adding the finely divided acid chloride to an aqueous solution containing a slight excess of the amine. With thorough agitation the reaction mixture is warmed to 60 to 70° C. and maintained at this temperature for a short time. When cool, the product is recovered by filtration, washed with water, and dried.

1-amino-4-bromoanthraquinone-2 - carboxylic acid chloride is prepared by treating 1-aminoanthraquinone-2-carboxylic acid first with bromine in nitrobenzene and then with thionyl chloride in the following manner.

10 grams of 1-aminoanthraquinone-2-carboxylic acid chloride are slurried in 100 grams of dry nitrobenzene and heated to 100° C. At this temperature 6.5 grams of bromine in 15 grams of nitrobenzene are added to the reaction flask over a period of ten minutes. The temperature is raised rapidly to 200° C. and maintained at this point for only a short time following which the reaction mixture is allowed to cool to 100° C. 10 grams of thionyl chloride are added to the flask, and heating at 100° C. is continued until no more hydrogen chloride gas escapes. Normally, this will require approximately two hours. When cool, the 1-amino-4-bromoanthraquinone-2-carboxylic acid chloride formed crystallizes out and is recovered by filtration, washed with ether, and dried. When immersed in a pre-heated melting point bath the compound shows a melting point of 218° to 220° C.

Amines having the formula:

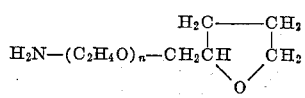

can be prepared by aminating alcohols having the formula:

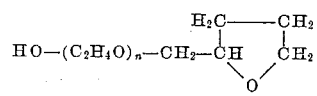

wherein $n$ has the meaning previously assigned to it according to the process described in U. S. Patent 2,285,419, issued June 9, 1942, to J. B. Dickey and A. R. Gray. The procedures employed in Examples XIX, XX, XXI, or XXII of this patent may be applied to the production of any of the amines herein employed to produce the compounds of our invention.

Alcohols having the formula specified in the preceding paragraph can be prepared in accordance with the process described in U. S. Patent 2,196,748, issued April 9, 1940, to J. B. Dickey.

The anthraquinone compounds of our invention are, for the most part, relatively insoluble in water and, accordingly, they may be advantageously directly applied to the material in the form of an aqueous suspension which can be prepared by grinding the dye to a paste in the presence of a sulfonated oil, soap, or other suitable dispersing agent and dispersing the resulting paste in water.

Direct dyeing operations are ordinarily carried out by immersing the material to be dyed or colored in the aqueous suspension at a temperature of 45°–55° C. following which the temperature is raised to 75°–85° C. The duration of immersion depends on the depth of shade desired, a long immersion producing a deep coloration and a shorter immersion yielding a weaker shade. The weight of dye employed also is governed by the depth of coloration desired. In general 1–3% by weight of dye to material is used. Upon completion of the dyeing operation the material is removed, washed with soap, rinsed, and dried.

While the use of the compounds of our invention has been illustrated in connection with the dyeing of cellulose acetate rayon, it will be understood that the other materials named herein can be substituted for the cellulose acetate rayon and the dyeing operation carried out in the manner described. Again, while the colors yielded by the dye compounds have been given with reference to cellulose acetate rayon, ordinarily generally similar colors are obtained on textile materials made of the other cellulose carboxylic esters indicated herein. The dye compounds of our invention also possess some utility for the coloration of wool, nylon and silk textile materials. They may be applied to these materials by the method described above or by any other suitable known method used for the dyeing of these materials.

We claim:
1. The anthraquinone compounds having the formula:

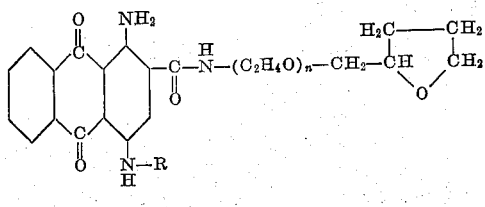

wherein R represents a member selected from the group consisting of a hydrogen atom, an alkyl group having one to four, inclusive, carbon atoms, a hydroxyalkyl group having two to three, inclusive, carbon atoms and an alkoxyalkyl group having three to four, inclusive, carbon atoms and wherein $n$ represents a number selected from the group consisting of one, two and three.

2. The anthraquinone compounds having the formula:

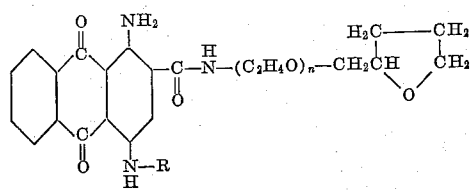

wherein R represents an alkyl group having one to four, inclusive, carbon atoms and $n$ represents a number selected from the group consisting of one, two and three.

3. The anthraquinone compounds having the formula:

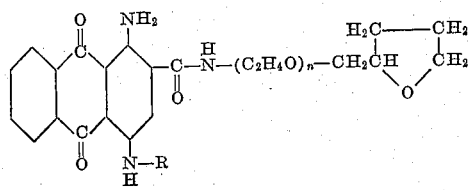

wherein R represents a hydroxyalkyl group having two to three, inclusive, carbon atoms and $n$ represents a number selected from the group consisting of one, two and three.

4. The anthraquinone compounds having the formula:

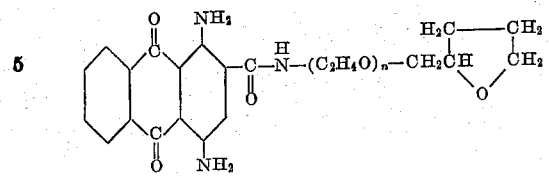

wherein $n$ represents a number selected from the group consisting of one, two and three.

5. The anthraquinone compound having the formula:

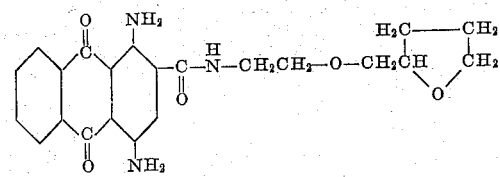

6. The anthraquinone compound having the formula:

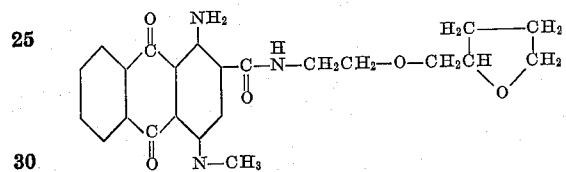

7. The anthraquinone compound having the formula:

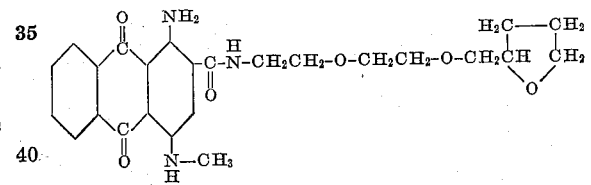

JOSEPH B. DICKEY.
ANTHONY LORIA.

REFERENCES CITED

The following references are of record in the file of this patent:

UNITED STATES PATENTS

| Number | Name | Date |
|---|---|---|
| 2,176,437 | Runne et al. | Oct. 17, 1939 |
| 2,242,760 | Schoeller et al. | May 20, 1941 |
| 2,372,663 | Dickey et al. | Apr. 3, 1945 |
| 2,383,236 | Buckley | Aug. 21, 1945 |